United States Patent
Jia et al.

(10) Patent No.: US 7,611,680 B2
(45) Date of Patent: Nov. 3, 2009

(54) PLATINUM-BISMUTH CATALYSTS FOR TREATING ENGINE EXHAUST

(75) Inventors: Jifei Jia, El Cerrito, CA (US); Kyle L. Fujdala, San Jose, CA (US); Timothy J. Truex, Oxnard, CA (US)

(73) Assignee: Nanostellar, Inc., Redwood City, CA (US)

( * ) Notice: Subject to any disclaimer, the term of this patent is extended or adjusted under 35 U.S.C. 154(b) by 363 days.

(21) Appl. No.: 11/621,498

(22) Filed: Jan. 9, 2007

(65) Prior Publication Data

US 2008/0003155 A1     Jan. 3, 2008

Related U.S. Application Data

(63) Continuation-in-part of application No. 11/342,166, filed on Jan. 26, 2006, now abandoned, and a continuation-in-part of application No. 11/261,132, filed on Oct. 28, 2005, now Pat. No. 7,381,683, which is a continuation of application No. 10/987,456, filed on Nov. 12, 2004, now abandoned, which is a continuation-in-part of application No. 10/975,646, filed on Oct. 28, 2004, now abandoned.

(60) Provisional application No. 60/866,566, filed on Nov. 20, 2006.

(51) Int. Cl.
*B01D 50/00* (2006.01)
*B01D 53/34* (2006.01)
*B01J 23/00* (2006.01)
*B01J 20/00* (2006.01)
*B01J 21/00* (2006.01)

(52) U.S. Cl. .............. 422/177; 422/170; 422/180; 502/327; 502/332; 502/334; 502/339; 502/354; 502/355; 502/415; 502/439; 502/527.12; 502/527.18; 502/527.19

(58) Field of Classification Search .......... 502/303, 502/327, 332, 334, 339, 354, 355, 415, 439, 502/527.12, 527.18, 527.19; 422/170, 177, 422/180
See application file for complete search history.

(56) References Cited

U.S. PATENT DOCUMENTS 4,025,606 A    5/1977    Acres (Continued)

FOREIGN PATENT DOCUMENTS

EP    1201300    9/2004

OTHER PUBLICATIONS

T. Mallat et al., "Selective Oxidation of Cinnamyl Alcohol to Cinnamaldehyde with Air over Bi-Pt/Alumina Catalysts," Journal of Catalysis 153, Jan. 3, 1995. pp. 131-143.

Csilla Keresszegi et al., "A Simple Discrimination of the Promoter Effect in Alcohol Oxidation and Dehydrogenation over Platinum and Palladium," Journal of Catalysis 225, Apr. 5, 2004, pp. 138-146.

(Continued)

*Primary Examiner*—Cam N Nguyen
(74) *Attorney, Agent, or Firm*—Patterson & Sheridan, LLP

(57) ABSTRACT

An engine exhaust catalyst containing precious metal nanoparticles is promoted with bismuth. The bismuth promotion improves the catalyst's CO oxidation performance. Also, by varying the amount of bismuth that is added, the NO conversion rate that can be realized with the catalyst can be controlled. The control over the NO conversion rate is important because the passive regenerative performance of a particulate filter used in engine exhaust systems is based on the amount $NO_2$ that is present in the exhaust stream that reaches the particulate filter. The amount of $NO_2$ being produced needs to be optimized (not necessarily maximized) so that adequate particulate filter regeneration performance can be maintained while avoiding unused, toxic $NO_2$ from being exhausted into the atmosphere.

10 Claims, 4 Drawing Sheets

U.S. PATENT DOCUMENTS

| | | | |
|---|---|---|---|
| 4,079,097 A * | 3/1978 | Antos | 585/660 |
| 4,139,495 A * | 2/1979 | Antos | 502/327 |
| 4,529,718 A * | 7/1985 | Dupin | 502/439 |
| 4,624,940 A | 11/1986 | Wan et al. | |
| 4,868,150 A * | 9/1989 | Spooner et al. | 502/439 |
| 4,977,129 A | 12/1990 | Ernest | |
| 5,120,695 A | 6/1992 | Blumrich et al. | |
| 5,591,689 A * | 1/1997 | Wu et al. | 502/334 |
| 5,849,256 A | 12/1998 | Deeba et al. | |
| 5,911,961 A | 6/1999 | Horiuchi et al. | |
| 6,022,826 A | 2/2000 | Deeba et al. | |
| 6,150,296 A * | 11/2000 | Heinerman et al. | 502/152 |
| 6,627,777 B2 * | 9/2003 | Rossi et al. | 570/181 |
| 6,667,270 B2 * | 12/2003 | Tanev | 502/208 |
| 6,685,899 B1 | 2/2004 | Park | |
| 6,685,900 B2 | 2/2004 | Domesle et al. | |
| 6,858,769 B2 * | 2/2005 | Woodle et al. | 585/658 |
| 6,875,253 B2 | 4/2005 | Daimon et al. | |
| 6,927,191 B2 * | 8/2005 | Kawabata et al. | 502/330 |
| 7,138,358 B2 * | 11/2006 | Huang et al. | 502/326 |
| 7,351,382 B2 * | 4/2008 | Pfeifer et al. | 422/177 |
| 7,381,683 B1 * | 6/2008 | Wang et al. | 502/327 |
| 7,538,063 B2 * | 5/2009 | Tanev | 502/202 |
| 2003/0220193 A1 * | 11/2003 | Tanev | 502/208 |
| 2004/0065078 A1 | 4/2004 | Schafer-Sindlinger et al. | |
| 2004/0126287 A1 * | 7/2004 | Zhang et al. | 422/177 |
| 2005/0282698 A1 * | 12/2005 | Southward et al. | 502/34 |

OTHER PUBLICATIONS

R. Burch et al., "A Combined Transient and Computation Study of the Dissociation of $N_2O$ on Platinum Catalysts," Journal of Catalysis 224, Mar. 5, 2004. pp. 252-260.

Serena Biella et al., "Selective Oxidation of D-Glucose on Gold Catalyst," Journal of Catalysis 206, Nov. 20, 2001. pp. 242-247.

Hiroshi Kimura et al., "Selective Oxidation of Glycerol on a Platinum-Bismuth Catalyst," Applied Catalysis A: General 96 (1993), pp. 217-228, (APCAT A2466); and Erratum, Applied Catalysis A: General 123 (1995), p. 323.

GB International Search Report, GB0710116.5, Oct. 2, 2007.

* cited by examiner

PLATINUM-BISMUTH CATALYSTS FOR TREATING ENGINE EXHAUST

CROSS-REFERENCE TO RELATED APPLICATIONS

This application is a continuation-in-part of U.S. patent application Ser. No. 11/342,166, filed Jan. 26, 2006 now abandoned, which is incorporated by reference herein and is a continuation-in-part of U.S. application Ser. No. 11/261,132, filed Oct. 28, 2005 now U.S. Pat. No. 7,381,683, which is a continuation of U.S. patent application Ser. No. 10/987,456, filed Nov. 12, 2004 now abandoned, which is a continuation-in-part of U.S. patent application Ser. No. 10/975,646, filed Oct. 28, 2004 now abandoned. This application claims the benefit of U.S. Provisional Patent Application Ser. No. 60/866,566, filed Nov. 20, 2006, which is herein incorporated by reference.

BACKGROUND OF THE INVENTION

1. Field of the Invention

Embodiments of the present invention generally relate to supported catalysts containing a precious group metal and, and more particularly, to an engine exhaust catalyst containing platinum and bismuth and an engine exhaust treatment system that employs such a catalyst.

2. Description of the Related Art

Many industrial products such as fuels, lubricants, polymers, fibers, drugs, and other chemicals would not be manufacturable without the use of catalysts. Catalysts are also essential for the reduction of pollutants, particularly air pollutants created during the production of energy and by automobiles. Many industrial catalysts are composed of a high surface area support material upon which chemically active metal nanoparticles (i.e., nanometer sized metal particles) are dispersed. The support materials are generally inert, ceramic type materials having surface areas on the order of hundreds of square meters/gram. This high specific surface area usually requires a complex internal pore system. The metal nanoparticles are deposited on the support and dispersed throughout this internal pore system, and are generally between 1 and 100 nanometers in size.

Processes for making supported catalysts go back many years. One such process for making platinum catalysts, for example, involves the contacting of a support material such as alumina with a metal salt solution such as hexachloroplatinic acid in water. The metal salt solution "impregnates" or fills the pores of the support during this process. Following the impregnation, the support containing the metal salt solution would be dried, causing the metal salt to precipitate within the pores. The support containing the precipitated metal salt would then be calcined (typically in air) and, if necessary, exposed to a reducing gas environment (e.g., hydrogen or carbon monoxide) for further reduction to form metal particles. Another process for making supported catalysts involves the steps of contacting a support material with a metal salt solution and reducing the metal ions to metal particles in situ using suitable reducing agents.

Supported catalysts are quite useful in removing pollutants from vehicle exhausts. Vehicle exhausts contain harmful pollutants, such as carbon monoxide (CO), unburned hydrocarbons (HC), and nitrogen oxides (NOx), that contribute to the "smog-effect" that have plagued major metropolitan areas across the globe. Catalytic converters containing supported catalysts and particulate filters have been used to remove such harmful pollutants from the vehicle exhaust. While pollution from vehicle exhaust has decreased over the years from the use of catalytic converters and particulate filters, research into improved supported catalysts has been continuing as requirements for vehicle emission control have become more stringent and as vehicle manufacturers seek to use less amounts of precious metal in the supported catalysts to reduce the total cost of emission control.

The prior art teaches the use of supported catalysts promoted with bismuth for purifying diesel engine exhaust gases. U.S. Pat. No. 5,911,961 teaches a catalyst composition for use as a diesel engine exhaust catalyst that comprises a titania carrier containing platinum and bismuth oxide. U.S. Pat. No. 6,685,899 teaches a catalyst composition for use as a diesel engine exhaust catalyst that comprises a CuO-doped carrier, such as CuO-doped zirconia or CuO-doped titania, containing platinum and bismuth oxide.

SUMMARY OF THE INVENTION

The present invention provides an engine exhaust catalyst having precious metal nanoparticles that is promoted with bismuth and an engine exhaust treatment system that employs such a catalyst. The engine may be a vehicle engine, an industrial engine, or generally, any type of engine that burns hydrocarbons. The bismuth promotion improves the catalyst's CO oxidation performance. Also, by varying the amount of bismuth that is added, the NO conversion (oxidation) rate that can be realized with the catalyst can be controlled. Control over the NO conversion (oxidation) rate is important because the passive regenerative performance of a particulate filter used in an engine exhaust system is based on the amount of $NO_2$ that is present in the exhaust stream that reaches the particulate filter. It is highly desirable that the minimum amount of $NO_2$ sufficient to properly burn the particulate matter trapped on the filter is present in order to minimize the amount of this harmful pollutant emitted into the atmosphere. Therefore, any additional control over the process of NO oxidation would prove extremely valuable for designing an emission control system.

According to a first embodiment, an engine exhaust catalyst containing platinum nanoparticles supported on an oxide carrier, preferably alumina, is promoted with bismuth, wherein the platinum nanoparticles are fixed in the pores of the oxide support by an in situ reduction process. The amount of bismuth in the catalyst is about 0.1% to about 20% by weight and is preferably from about 0.5% to about 8% by weight. The amount of platinum in the catalyst is about 0.1% to about 10% by weight and is preferably from about 1% to about 5% by weight. In contrast to the engine exhaust catalysts promoted with bismuth in the prior art, which are prepared using standard impregnation techniques, the platinum metal nanoparticles of the engine exhaust catalyst according to the first embodiment are fixed in the pores of the oxide support by an in situ reduction process.

According to a second embodiment, a diesel engine exhaust catalyst containing platinum nanoparticles supported on alumina is promoted with bismuth, wherein the amount of bismuth in the catalyst is about 0.1% to about 20% by weight and is preferably from about 0.5% to about 8% by weight. The amount of platinum in the catalyst is about 0.1% to about 10% by weight and is preferably from about 1% to about 5% by weight. In this embodiment, platinum nanoparticles are fixed in the pores of alumina by either an in situ reduction process or standard impregnation techniques. The prior art teaches diesel engine exhaust catalysts promoted with bismuth but not in conjunction with an alumina carrier. In fact, U.S. Pat. No. 6,685,899 discourages the use of alumina in diesel engines (in contrast to its use in gasoline engines) because alumina adsorbs sulfur dioxide at low temperatures and emits sulfur trioxide at high temperatures.

A method of producing a supported catalyst according to an embodiment of the present invention includes the steps of mixing a carrier (typically an oxide) in powder form and a precious group metal salt in a solvent to create a mixture and adding a reducing agent to the mixture to reduce the precious group metal nanoparticles in the pores of the carrier. A bismuth compound may then be added to the carrier containing the precious group metal nanoparticles to form a supported catalyst promoted with bismuth. A preferred embodiment employs drying and calcination of the supported catalyst prior to bismuth compound addition, followed by addition of the bismuth compound via incipient wetness impregnation.

The present invention also provides a method for tuning a catalyst for use with an exhaust treatment system comprising the catalyst and a particulate filter. In this method, a first NO conversion rate of a catalyst promoted with a first amount of bismuth is measured and a second NO conversion rate of a catalyst promoted with a second amount of bismuth is measured. Then, one of the two catalysts is selected based on a desired NO conversion rate, which can be determined based on tests on the particulate filter within a particular exhaust system and is roughly correlated to the rate that produces the optimal amount of $NO_2$ for passive regeneration of the particulate filter within the particular exhaust system.

Optional uses of the catalysts produced according to the present invention include application to a monolith that is to be positioned prior to a particulate filter as a primary DOC (diesel oxidation catalyst) or a pre-filter catalyst, and application to a particulate filter (i.e., to make a catalyzed particulate filter) to locally aid in the regeneration process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Likewise, reference to "the invention" shall not be construed as a generalization of any inventive subject matter disclosed herein and shall not be considered to be an element or limitation of the appended claims except where explicitly recited in the claims.

FIGS. 1A-1D are schematic representations of different diesel exhaust systems in which embodiments of the present invention may be used. The combustion process that occurs in a diesel engine produces harmful pollutants, such as CO, various hydrocarbons, particulate matter, and nitrogen oxides (NOx), in an exhaust stream that is discharged through the exhaust system.

Figure 1A:
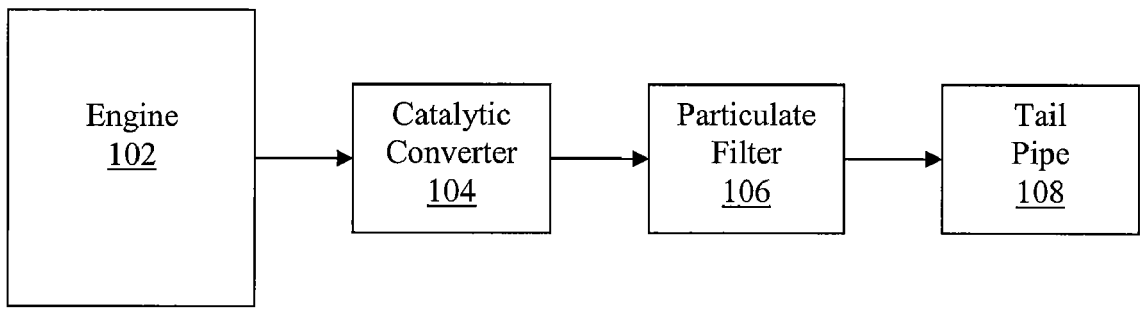
FIGS. 1A-1D are schematic representations of different diesel exhaust systems in which embodiments of the present invention may be used.

In the exhaust system of FIG. 1A, the exhaust stream passes through a diesel catalytic converter 104 and a particulate filter 106, before it is discharged into the atmosphere through a tail pipe 108. The diesel catalytic converter 104 contains supported catalysts coated on a monolith substrate, and various catalytic reactions occur within the diesel catalytic converter 104. These reactions include the oxidation of CO to form $CO_2$, burning of hydrocarbons, and the conversion of NO to $NO_2$. The particulate filter 106 traps particulate matter that is in the exhaust stream, e.g., soot, liquid hydrocarbons, generally particulates in liquid form.

Figure 1B:
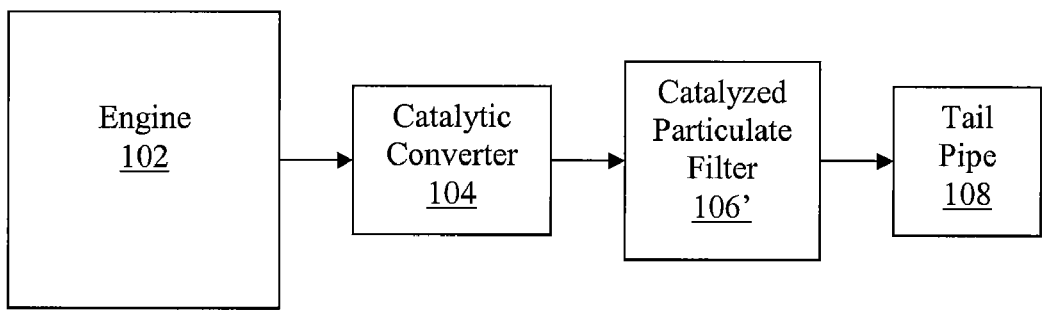

In the exhaust system of FIG. 1B, the exhaust stream passes through a diesel catalytic converter 104 and a catalyzed particulate filter 106', before it is discharged into the atmosphere through a tail pipe 108. This exhaust system is the same as that of FIG. 1A, except that the particulate filter 106' includes a supported catalyst coated thereon for the oxidation of NO.

Figure 1C:
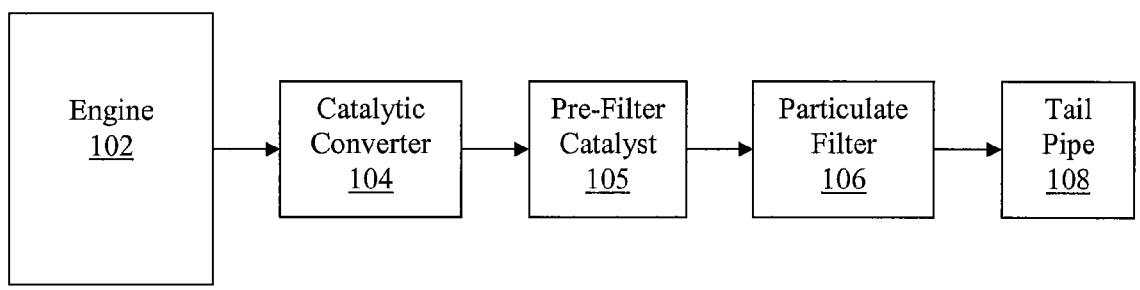

In the exhaust system of FIG. 1C, the exhaust stream passes through a diesel catalytic converter 104, a pre-filter catalyst 105 and a particulate filter 106, before it is discharged into the atmosphere through a tail pipe 108. This exhaust system is the same as that of FIG. 1A, except that a pre-filter catalyst 105 having supported catalysts coated on a monolith support is provided for the oxidation of NO.

Figure 1D:
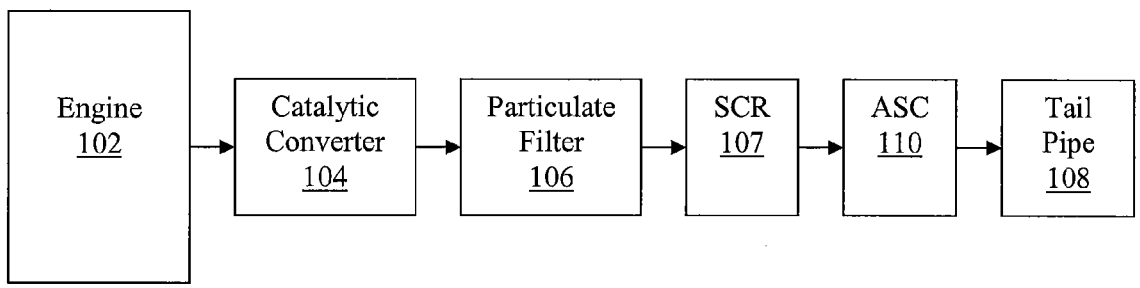

In the exhaust system of FIG. 1D, the exhaust stream passes through a diesel catalytic converter 104, a particulate filter 106, a selective catalytic reduction (SCR) unit 107 and an ammonia slip catalyst 110, before it is discharged into the atmosphere through a tail pipe 108. This exhaust system is the same as that of FIG. 1A, except that the SCR unit 107 and the ammonia slip catalyst 110 are additionally provided after the particulate filter 106. The SCR unit 107 is provided to reduce the NOx species to $N_2$. The SCR unit 107 may be ammonia/urea based or hydrocarbon based. The ammonia slip catalyst 110 is provided to reduce the amount of ammonia emissions through the tail pipe 108. An alternative configuration places the SCR unit 107 in front of the particulate filter 106.

Alternative configurations of the exhaust system includes the provision of SCR unit 107 and the ammonia slip catalyst 110 in the exhaust system of FIG. 1B or 1C, and the provision of just the SCR unit 107, without the ammonia slip catalyst 110, in the exhaust system of FIGS. 1A, 1B or 1C.

As particulates get trapped in the particulate filter within the exhaust system of FIG. 1A, 1B, 1C or 1D, it becomes less effective and regeneration of the particulate filter becomes necessary. The regeneration of the particulate filter can be either passive or active. Passive regeneration occurs automatically in the presence of $NO_2$. Thus, as the exhaust stream containing $NO_2$ passes through the particulate filter, passive regeneration occurs. During regeneration, the particulates get oxidized and $NO_2$ gets converted back to NO. In general, higher amounts of $NO_2$ improve the regeneration performance, and thus this process is commonly referred to as $NO_2$ assisted oxidation. However, too much $NO_2$ is not desirable because excess $NO_2$ is released into the atmosphere and $NO_2$ is considered to be a more harmful pollutant than NO. The $NO_2$ used for regeneration can be formed in the engine during combustion, from NO oxidation in the diesel catalytic converter 104, from NO oxidation in the pre-filter catalyst 105, and/or from NO oxidation in the catalyzed particulate filter 106'.

Active generation is carried out by heating up the particulate filter 106 and oxidizing the particulates. At higher temperatures, $NO_2$ assistance of the particulate oxidation becomes less important. The heating of the particulate filter 106 may be carried out in various ways known in the art. One way is to employ a fuel burner which heats the particulate filter 106 to particulate combustion temperatures. Another way is to increase the temperature of the exhaust stream by modifying the engine output when the particulate filter load reaches a pre-determined level.

Embodiments of the present invention provide an engine exhaust catalyst comprising an alumina support and platinum nanoparticles, that is promoted with bismuth. The inventors have observed improved CO oxidation performance when an engine exhaust catalyst comprising an alumina support and platinum nanoparticles is promoted with bismuth. This has been observed for both fresh Pt—Bi catalysts and aged Pt—Bi catalysts. Tables 1 and 2 below show the improvement in the CO oxidation performance of a platinum catalyst supported on alumina when it is promoted with bismuth.

TABLE 1

|  | Pt (wt %) | Bi (wt %) | 2nd Run CO T50 (° C.) |
|---|---|---|---|
| Example 1 | 3 | 0 | 179 |
| Example 2 | 3 | 8 | 129 |
| Example 3 | 3 | 4 | 128 |
| Example 4 | 3 | 3 | 126 |
| Example 5 | 3 | 2 | 120 |
| Example 6 | 3 | 1 | 134 |
| Example 7 | 3 | 0.5 | 144 |

TABLE 2

|  | Pt (wt %) | Bi (wt %) | 2nd Run CO T50 (° C.) |
|---|---|---|---|
| Example 1 | 3 | 0 | 237 |
| Example 2 | 3 | 8 | 178 |
| Example 3 | 3 | 4 | 165 |
| Example 5 | 3 | 2 | 167 |

Table 1 is the observed data for fresh catalysts and Table 2 is the observed data for aged catalysts. Aging of the catalysts was carried out at a temperature of 750° C. for 20 hours with an atmosphere of 10% water in air. Use of "T50" represents a convenient metric for measuring CO oxidation performance, i.e., the temperature at which 50% yield of CO to $CO_2$ is observed. The T50 temperature was obtained under the following test conditions using a fixed bed flow reactor. A 15 mg sample of each catalyst (80-100 mesh size) was mixed with 85 mg of alpha-alumina (80-100 mesh size) and tested for oxidation performance using a gas mixture comprised of 1000 ppm CO, 350 ppm hydrocarbons ($C_3H_6/C_3H_8$=7:3), 450 ppm NO, 10% $O_2$, and 10% $CO_2$ (balance He). The total flow through the catalyst was 300 cc/min. The heating rate was 10° C. $min^{-1}$. Light-off temperatures for CO were obtained for two ramps of increasing temperature (1st run and 2nd run). It is believed that the 2nd run data represent performance from a more stabilized catalyst surface (i.e., providing more reproducible results). Subsequent runs for selected examples did not deviate from the 2nd run data. As a result, 2nd run data are presented in Tables 1 and 2. The preparation methods for Examples 1 through 7 are detailed in the description provided below.

As can be seen from the test data in Table 1, a significant reduction in the CO oxidation T50 temperature can be obtained by promoting a platinum catalyst supported on alumina with just 0.5% bismuth by weight. The preferred range appears to be around 0.5% to 3%. Table 2 shows a significant reduction in the CO oxidation T50 temperature for the aged platinum catalysts supported on alumina promoted with 2%, 4% or 8% bismuth by weight.

The inventors have also observed that the NO conversion (oxidation) rate can be controlled by varying the amount of bismuth in a diesel engine exhaust catalyst. The control over the NO conversion rate is important because the passive regenerative performance of the particulate filter 106 is partly based on the amount $NO_2$ that is present in the exhaust stream that reaches the particulate filter 106. As described above, $NO_2$ assists the oxidation of the particulates accumulated in the particulate filter 106, but too much $NO_2$ is not desirable because any excess $NO_2$ will be exhausted into the atmosphere. By adjusting the amount of bismuth in an engine exhaust catalyst, the amount of $NO_2$ gas that is supplied to the particulate filter 106 may be tuned to reduce the amount of $NO_2$ gas that is released into the air.

TABLE 3

|  | Pt (wt %) | Bi (wt %) | 2nd Run NO conversion at 240° C. (%) |
|---|---|---|---|
| Example 1 | 3 | 0 | 80 |
| Example 2 | 3 | 8 | 19 |
| Example 3 | 3 | 4 | 29 |
| Example 4 | 3 | 3 | 50 |
| Example 5 | 3 | 2 | 60 |
| Example 6 | 3 | 1 | 73 |
| Example 7 | 3 | 0.5 | 78 |

TABLE 4

|  | Pt (wt %) | Bi (wt %) | 2nd Run NO conversion at 240° C. (%) |
|---|---|---|---|
| Example 1 | 3 | 0 | 4 |
| Example 2 | 3 | 8 | 7 |
| Example 3 | 3 | 4 | 15 |
| Example 5 | 3 | 2 | 19 |

TABLE 5

|  | Pt (wt %) | Bi (wt %) | 2nd Run NO conversion at 300° C. (%) |
|---|---|---|---|
| Example 1 | 3 | 0 | 45 |
| Example 2 | 3 | 8 | 18 |
| Example 3 | 3 | 4 | 27 |
| Example 5 | 3 | 2 | 31 |

Table 3 provides the observed data for fresh catalysts, and Tables 4 and 5 show the observed data for aged catalysts. Aging of the catalysts was carried out at a temperature of 750° C. for 20 hours with an atmosphere of 10% water in air. The NO conversion rates in the tables are shown as percent converted. Table 3 and 4 data represent the NO conversion at a temperature of 240° C. Table 5 data represent the NO conversion at a temperature of 300° C. The test conditions for collecting the data for Tables 3, 4 and 5 were as described above. 2nd run data are presented in Tables 3, 4 and 5. The preparation methods for Examples 1 through 7 are outlined in the description provided below.

As can be seen from the test data in Table 3, a significant change in the NO conversion rate can be obtained by promoting a platinum catalyst supported on alumina with just 2%, 3%, 4% or 8% bismuth by weight. Tables 4 and 5 also show a significant change in the NO conversion rate for the aged platinum catalysts supported on alumina promoted with 2%, 4% or 8% bismuth by weight. Note that the NO conversion is higher at 240° C. for the bismuth promoted catalysts, when compared with the Pt-only catalyst.

Figure 2:
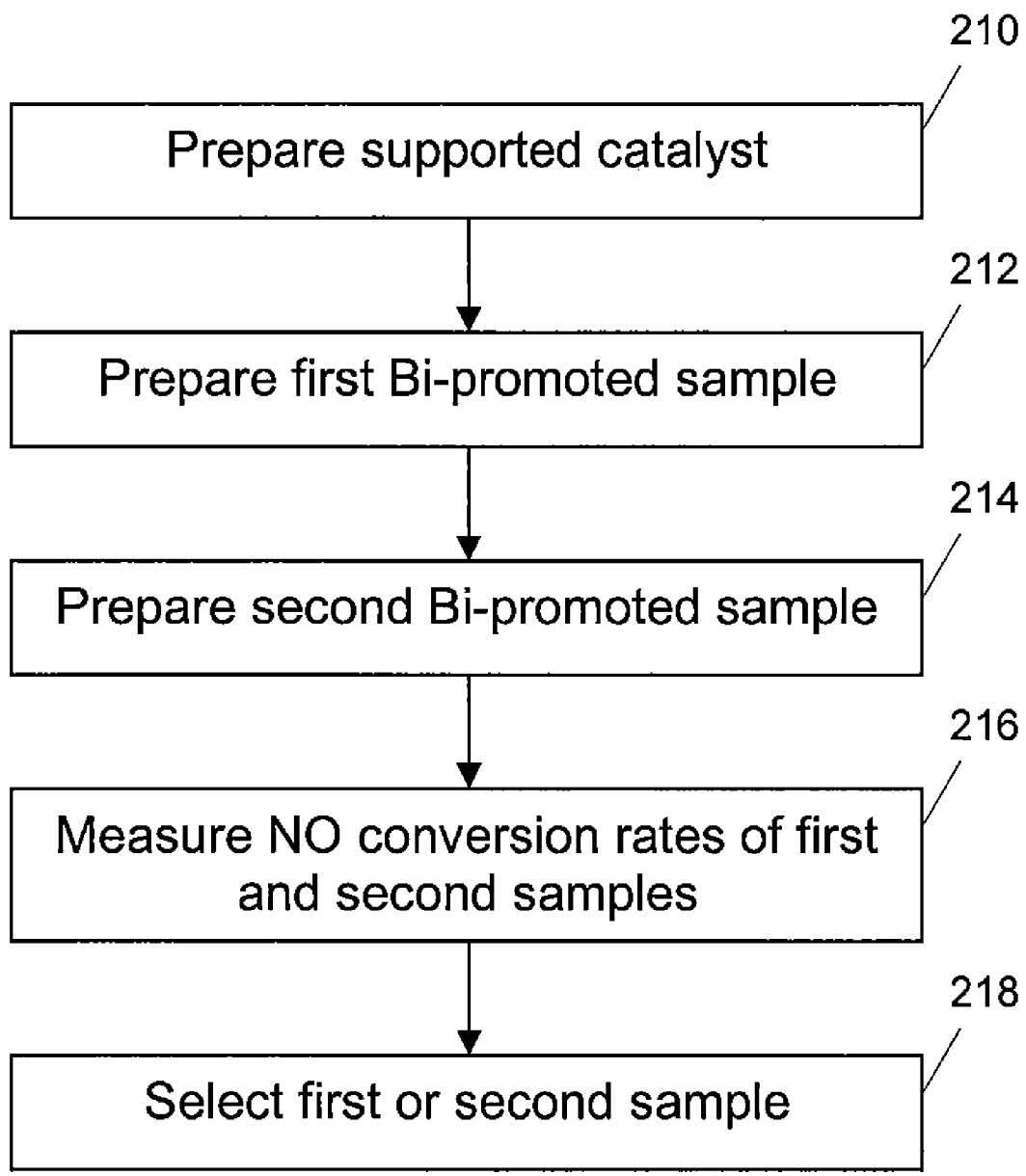
FIG. 2 illustrates the steps of carrying out a process for tuning a catalyst according to an embodiment of the present invention.

FIG. 2 illustrates the steps of carrying out a process for tuning a catalyst according to an embodiment of the present invention. In this method, catalysts promoted with different amounts of bismuth are prepared and tested so that the NO conversion rate can be controlled. Control over the NO conversion rate is desirable so that the minimum amount of $NO_2$ sufficient to properly burn the particulate matter trapped on the particulate filter is present in order to minimize the amount of this harmful pollutant emitted into the atmosphere. In cases where an SCR unit is provided after the particulate filter, it is important to control the relative amounts of NO and $NO_2$ exiting the particulate filter and entering the SCR unit, so as to improve the efficiency of the SCR unit.

In step 210, a platinum catalyst supported on alumina is prepared in accordance with various preparation methods known in the art, including the ones disclosed in co-pending U.S. patent application Ser. No. 11/342,166. In step 212, a first sample is prepared by taking a portion of the sample prepared in step 210 and promoting it with bismuth in accordance with preparation methods known in the art, including the promotion techniques described below for Examples 2 through 7. A second sample is prepared in step 214 in the same manner as in step 212 except a different amount of bismuth is used in promoting a second portion of the sample prepared in step 210. In step 216, the NO conversion rate is measured for both samples. In step 218, the sample that has a measured NO conversion rate that is closer to the desired NO conversion rate is selected as the catalyst to be used in an exhaust treatment system.

The desired NO conversion rate is determined based on tests on the particulate filter 106 within a particular exhaust system and is roughly correlated to the rate that produces the optimal amount of $NO_2$ for passive regeneration of the particulate filter 106 within the particular exhaust system. The desired NO conversion rate is likely to be different for different exhaust systems, but once this desired NO conversion rate is determined, the process described above is applicable to any exhaust system having a catalytic converter and a particulate filter.

Figure 3:
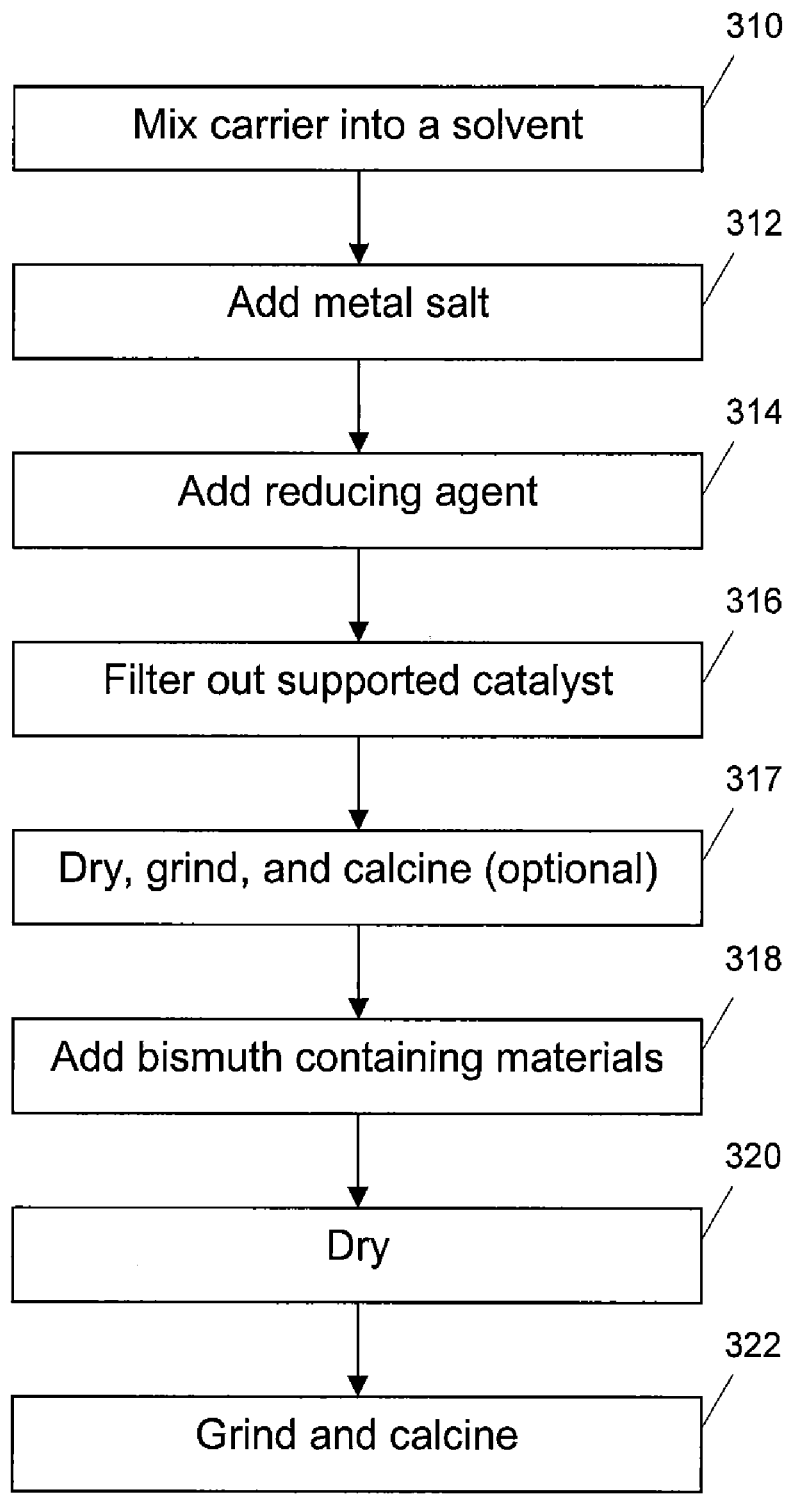
FIG. 3 illustrates the steps for carrying out a process for preparing supported catalysts according to an embodiment of the present invention.

FIG. 3 illustrates the steps for carrying out a process for preparing supported catalysts according to an embodiment of the present invention. This process is used in preparing Examples 2 through 7. In step 310, a carrier in powder form is mixed with a solvent to create a mixture. Sufficient agitation to keep the carrier in suspension within the solution is desirable. If necessary, the temperature may be adjusted. Ambient temperature or room temperature may be used, within a range of about 15° C. to about 30° C.

In step 312, a metal, provided as a metal salt, may be added to the mixture in either a dissolved form as part of a salt solution or in solid form. After the metal salt is added, the solution is mixed. Sufficient agitation to keep the carrier in suspension is desirable. Agitation is also required to fully dissolve the metal salt within the solution and reduce any salt concentration gradients within the solution. The pH and temperature of the solution may, however, be adjusted if desired. If the temperature or pH is adjusted, additional mixing may be necessary. Alternatively, the solvent containing the metal salt and the carrier may be prepared by first adding the metal salt in either dissolved form as part of a salt solution or in solid form into the solvent and mixing the salt and solvent together for a time period and then adding the carrier materials into the solvent. As another alternative, the metal salt and the carrier may be added to the solvent concurrently and then mixed together in the solvent.

In step 314, a reducing agent, and optionally a monomer (which may be the reducing agent), is then added to reduce the metal catalyst into the pores of the carrier in situ. Sufficient agitation to keep the carrier in suspension is desirable. Mixing is carried out for a time period that is long enough to cause the precipitation and/or reduction of the metal salt in the pores of the carrier materials. If a monomer is used with or as the reducing agent, the mixture may be heated or subjected to ultraviolet light, or polymerization initiators, such as AIBN or various types of peroxides, so as to initiate or increase the polymerization of the monomer that is added. The mixture is then filtered to separate out the carrier containing metal catalyst particles (step 316). The carrier containing metal catalyst particles are then dried, ground and calcined in step 317. Step 317 is optional but preferred.

In step 318, bismuth containing materials, such as bismuth citrate, may be mixed with the carrier containing metal catalyst particles in a solution using an incipient wetness impregnation technique. Other techniques known in the art for promoting the carrier containing metal catalyst particles with bismuth may be used here. The carrier containing metal catalyst particles and promoted with bismuth is then dried at an elevated temperature (step 320). The dried catalyst is then be ground into a fine powder and calcined in air at a temperature of about 500° C. or higher (step 322). The calcination is carried out for about 2 to about 8 hours. The calcination step serves to remove any organic residues such as any organic polymer that was formed in situ and remained in the pores of the carrier or any organic ligands from the bismuth compound and it also helps to fix the bismuth on the carrier.

In the above described process, the carrier may comprise support materials such as alumina, silica, oxides of vanadium, oxides of titanium, oxides of zirconium, oxides of iron, cerium oxides, carbon, zeolites, molecular sieves, and various combinations thereof. Any of these support materials may be doped with lanthanum, other rare earth elements, alkali metals, alkaline earth metals, sulfur, selenium, tellurium, phosphorus, arsenic, antimony, or bismuth. The metal may comprise Pt, Pd, Ru, Rh, Re, Cu, Au, Ir, Os, Fe, and Ag. The metal particles may be provided as a precursor in the solution from a salt. Exemplary salts of the metal precursors include soluble salts of Pt, Pd, Au, Rh, Ir, Ag, Cu, Fe, Re, Os, and Ru. Pd salts that are suitable include $Pd(NH_3)_4(NO_3)_2$ and $Pd(NO_3)_2$. Pt salts that are suitable include $Pt(NO_3)_2$, $(NH_3)_4Pt(NO_3)_2$, $H_2PtCl_6$, $K_2PtCl_4$, $(NH_3)_4Pt(OH)_2$, and $Cl_4Pt(NH_3)_2$. Ag and Cu salts that are suitable include $AgNO_3$, $AgCH_3COO$, $Cu(NO_3)_2$, $Cu(CH_3COO)_2$, and Cu(II)acetylacetonate. Additional salts that are suitable include $HAuCl_4$, $H_2IrCl_6$, $(NH_4)$ $_2IrCl_6$, and $Rh(NO_3)_3$. The concentration of the metal precursor in the resulting solution may be between about $10^{-4}$ M and about 1.0 M. The concentration of the metal precursor in the resulting solution depends upon the target weight loading of the final supported catalyst.

The solvent may be any liquid within which metal salt is suitably soluble, and which is sufficiently pure and can be removed from the carrier materials by evaporation, filtering, pump evacuation, centrifuge, or other similar means. Such solvents include, but are not limited to, water, alcohol, and other organic solvents. Preferably, water or double deionized water is used. Alcohols that are suitable include, but are not limited to, methanol and ethanol and their mixtures, with and without water. Other organic solvents include tetrahydrofuran, acetic acid, ethylene glycol, N-methylpyrrolidone, dimethylformamide, dimethylacetalmide, and their mixtures, with and without water.

The process of forming metal particles in situ may involve use of monomers capable of being polymerized in the solvent to form oligomers, polymers, or both in combination with a reducing agent or as bi-functional compounds for reduction and oligomerization/polymerization. A suitable monomer is acrylic acid, which is the preferred monomer for preparing platinum catalysts on alumina carriers. Other suitable monomers include, depending upon a particular metal-carrier combination, vinyl pyrrolidone, vinyl acetate, acrylamide, acrylic anhydride, sodium acrylate, glycidyl methacrylate, methacrylic acid, methacrylic anhydride, methyl methacrylate, 2-aminoethyl methacrylate hydrochloride, 1-vinylimidazole, allylamine, diallylamine, 4-vinyl benzoic acid, 3-aminopropylmethyldiethoxysilane, 2-hydroxyethyl acrylate, 4-acetoxy styrene, and combinations thereof.

The preparation methods for Examples 1 through 7 are provided below in additional detail.

EXAMPLE 1

Pt (3%) Bi (None)

To 10 L of deionized $H_2O$ was added 2000 g of La-doped alumina (having a BET surface area of 200 $m^2 g^{-1}$) followed by stirring for 30 minutes at room temperature. To this slurry was added 436.1 g of $Pt(NO_3)_2$ solution (13.76% $Pt(NO_3)_2$ by weight), followed by stirring at room temperature for 60 minutes. Acrylic acid (750 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C. $min^{-1}$).

EXAMPLE 2

Pt (3%) Bi (8%)

To 1900 g of the La-doped alumina supported Pt catalyst prepared according to Example 1 was added a solution/slurry of bismuth citrate in deionized water (290 g bismuth citrate in 2.2 L $H_2O$). The resulting paste was mixed at room temperature for 15 minutes using a high-shear mixer, dried at 120° C. for 2 hours, ground into a fine powder, and calcined in air for 2 hours at a temperature of 500° C. providing the final La-doped supported PtBi catalyst.

EXAMPLE 3

Pt (3%) Bi (4%)

To 2 g of the La-doped alumina supported Pt catalyst prepared according to Example 1 was added a solution of bismuth acetate (0.148 g bismuth acetate in 4 mL $H_2O$ and 1 mL glacial acetic acid). The resulting paste was mechanically mixed at room temperature for 60 minutes, dried at 13020 C. for 2.5 hours, ground into a fine powder, and calcined in air for 1 hour at a temperature of 500° C. providing the final La-doped supported PtBi catalyst.

EXAMPLE 4

Pt (3%) Bi (3%)

To 2 g of the La-doped alumina supported Pt catalyst prepared according to Example 1 was added a solution of bismuth acetate (0.111 g bismuth acetate in 4 mL $H_2O$ and 1 mL glacial acetic acid). The resulting paste was mechanically mixed at room temperature for 60 minutes, dried at 130° C. for 2.5 hours, ground into a fine powder, and calcined in air for 1 hour at a temperature of 500° C. providing the final La-doped supported PtBi catalyst.

EXAMPLE 5

Pt (3%) Bi (2%)

To 2 g of the La-doped alumina supported Pt catalyst prepared according to Example 1 was added a solution of bismuth acetate (0.074 g bismuth acetate in 4 mL $H_2O$ and 1 mL glacial acetic acid). The resulting paste was mechanically mixed at room temperature for 60 minutes, dried at 130° C. for 2.5 hours, ground into a fine powder, and calcined in air for 1 hour at a temperature of 500° C. providing the final La-doped supported PtBi catalyst.

EXAMPLE 6

Pt (3%) Bi (1%)

To 2 g of the La-doped alumina supported Pt catalyst prepared according to Example 1 was added a solution of bismuth acetate (0.037 g bismuth acetate in 4 mL $H_2O$ and 1 mL glacial acetic acid). The resulting paste was mechanically mixed at room temperature for 60 minutes, dried at 130° C. for 2.5 hours, ground into a fine powder, and calcined in air for 1 hour at a temperature of 500° C. providing the final La-doped supported PtBi catalyst.

EXAMPLE 7

Pt (3%) Bi (0.5%)

To 2 g of the La-doped alumina supported Pt catalyst prepared according to Example 1 was added a solution of bismuth acetate (0.019 g bismuth acetate in 4 mL $H_2O$ and 1 mL glacial acetic acid). The resulting paste was mechanically mixed at room temperature for 60 minutes, dried at 130° C. for 2.5 hours, ground into a fine powder, and calcined in air for 1 hour at a temperature of 500° C. providing the final La-doped supported PtBi catalyst.

The Pt—Bi supported catalysts prepared using the methods described above have weight loadings of 3% for Pt and 0.5% to 8% for Bi. The benefits of the present invention, however, can be obtained with other weight loadings for Pt and Bi. The Pt weight loading may range from 0.1% to 10%. The preferred range is 1% to 5%. The Bi weight loading may range from 0.1% to 20%. The preferred range is 0.5% to 8%.

While the foregoing is directed to embodiments of the present invention, other and further embodiments of the invention may be devised without departing from the basic scope thereof, and the scope thereof is determined by the claims that follow.

What is claimed is:

1. A diesel engine exhaust treatment system comprising:
   a supported catalyst comprising an alumina carrier promoted with bismuth, the alumina carrier having a plurality of pores, in which platinum metal particles are supported; and
   a particulate filter.

2. The diesel engine exhaust treatment system of claim 1, wherein the amount of bismuth is about 0.1 weight percent to about 20 weight percent, and the amount of platinum in the catalyst is about 0.1 weight percent to about 10 weight percent.

3. The diesel engine exhaust treatment system of claim 2, wherein the amount of bismuth is about 0.5 weight percent to about 8 weight percent, and the amount of platinum in the catalyst is about 1 weight percent to about 5 weight percent.

4. The diesel engine exhaust treatment system of claim 1, further comprising a monolith substrate on which the supported catalyst is coated.

5. The diesel engine exhaust treatment system of claim 4, wherein the supported catalyst coated on the monolith substrate is disposed upstream of the particulate filter.

6. The diesel engine exhaust treatment system of claim 5, wherein the supported catalyst coated on the monolith substrate is housed as part of a diesel oxidation catalyst.

7. The diesel engine exhaust treatment system of claim 5, further comprising a diesel oxidation catalyst, wherein the supported catalyst coated on the monolith substrate is housed as a pre-filter catalyst that is disposed downstream of the diesel oxidation catalyst.

8. The diesel engine exhaust treatment system of claim 1, wherein the supported catalyst is coated onto the particulate filter.

9. The diesel engine exhaust treatment system of claim 1, further comprising a selective catalytic reduction unit for treating an exhaust stream from the particulate filter.

10. The diesel engine exhaust treatment system of claim 9, further comprising an ammonia slip catalyst for treating an exhaust stream from the selective catalytic reduction unit.

* * * * *

Disclaimer 7,611,680—Jifei Jia, El Cerrito, CA (US); Kyle L. Fujdala, San Jose, CA (US); and Timothy J. Truex, Onard, CA (US). PLATINUM-BISMUTH CATALYSTS FOR TREATING ENGINE EXHAUST, patent dated Nov. 3, 2009. Disclaimer filed December 14, 2009 by the owner Nanostellar, Inc.

The term of this patent shall not extend beyond the expiration date of Patent No. 7,605,109.

*(Official Gazette, March 2, 2010)*